United States Patent [19]

Gemar

[11] Patent Number: 4,892,157

[45] Date of Patent: Jan. 9, 1990

[54] SEED METERING SHAFT ROTATION INDICATOR

[76] Inventor: LeRoy H. Gemar, 131 Riverview "B", Great Falls, Mont. 59404

[21] Appl. No.: 242,705

[22] Filed: Sep. 9, 1988

[51] Int. Cl.$^4$ .............................................. A01C 7/00
[52] U.S. Cl. .................................... 172/430; 111/903; 116/28 R; 116/175; 74/569
[58] Field of Search ...................... 172/430, 95; 111/1, 111/75, 76; 116/28 R, 175, 303; 40/218; 272/8 N, 27 N; 464/23; 221/2; 74/569

[56] References Cited

U.S. PATENT DOCUMENTS

| 650,480 | 5/1900 | Place ..................................... | 116/303 |
| 1,257,865 | 2/1918 | Holmes ............................... | 40/218 X |
| 2,022,354 | 11/1935 | Kirk ..................................... | 111/1 |
| 3,099,243 | 7/1963 | Schwartz ........................... | 116/28 R |
| 3,155,058 | 11/1964 | Valdi .................................... | 111/76 X |
| 3,331,532 | 7/1967 | Hori .................................... | 111/1 X |
| 3,355,102 | 11/1967 | Gregory, Jr. ........................ | 111/1 X |
| 3,385,242 | 5/1968 | Chancellor ............................ | 111/1 |
| 3,873,086 | 3/1975 | Lee ...................................... | 272/8 N |
| 3,921,159 | 11/1975 | Steffen ................................ | 111/1 X |
| 4,164,669 | 8/1979 | Knepler ............................... | 111/1 X |

Primary Examiner—Richard J. Johnson
Assistant Examiner—Jeffrey L. Thompson
Attorney, Agent, or Firm—Richard C. Conover

[57] ABSTRACT

An indicator is provided for indicating rotation of a seed metering shaft used with a grain drill. The present invention incorporates a cylinder mounted to the seed metering shaft with its longitudinal axis offset but parallel to the axis of the shaft. The cylinder is mounted to rotate with the shaft. An indicator arm is hingedly mounted to the frame of the grain drill with one end positioned to ride on the outer surface of the cylinder and the other end free to move in correspondence with movement of the first end. With this invention, the indicator arm moves continually with movement of the seed metering shaft and thus provides a continuous indication of rotation of the seed metering shaft.

3 Claims, 1 Drawing Sheet

SEED METERING SHAFT ROTATION INDICATOR

BACKGROUND OF THE INVENTION

This invention relates generally to a device for indicating rotation of a seed metering shaft used with a grain drill. This indicator provides a visual indication of shaft rotation whereby a farmer can easily check proper functioning of the seed metering shaft while pulling the seed drill through the field.

As is well known, grain drills are pulled behind tractors to plant seeds which are dropped from a grain hopper into a furrow formed by the grain drill. The flow of seed from a grain hopper is regulated by a rotating seed metering shaft as the grain drill moves across the field. In the past, there have been problems determining whether the planter is functioning properly. This results because of the dusty conditions which exist behind a tractor when pulling a grain drill. Under these conditions, it is difficult for an operator to detect when the seed metering shaft fails to rotate. As a consequence, an operator often continues to move over long distances unaware that the seed metering shaft has stopped rotating and that seeds are not being planted. Since the grain drill, as part of its normal operation, is also covering the furrows after the seed is planted, there is seldom any visible indication available to the operator that anything is wrong. Thus, the operator may continue moving over a field thinking he is planting seed when in fact he is not.

Seed sensors have been devised to sense seed flowing along a path from the seed hopper to the ground. For example, U.S. Pat. No. 4,164,669 to Knepler illustrates such a seed sensor installed on a seed planter. These seed sensors sense movement of the seed to indicate whether the planter is operating properly.

Another type of indicating device is shown in U.S. Pat. No. 3,921,159 to Steffen. This patent illustrates a device for monitoring the shaft rotation of a seed metering shaft. This device employs a magnet attached to the seed metering shaft and corresponding electronic circuitry which senses the magnet as it rotates with the shaft. When the shaft stops rotating, a visual indication is provided that a problem has occurred and that the planter is not functioning properly.

The applicant is also aware of a device for monitoring rotation of a seed metering shaft which includes a striker rod secured to the seed metering shaft transversely thereto. An indicator arm has one end mounted to be struck by the striker rod as the seed metering shaft rotates and has a second end which moves corresponding to the first end. As the seed metering shaft turns, the striker rod installed on the shaft strikes the indicator arm. Movement at the second end of the indicator arm provides a visual indication of shaft rotation.

Numerous problems were encountered with this striker rod device. The indicator arm motion was confusing in that the indication was generally steady for most of a shaft revolution cycle, but then an abrupt, jerky movement was displayed as the striker rod struck the indicator arm. With this device, an operator would have to watch the indicator for at least one complete revolution of the seed metering shaft. In addition, the striker rod mounted to the shaft tended to bend after use and the device became inoperable.

There has been a need for a simple mechanical indicator to indicate continued movement of the seed metering shaft which indicator continuously provides an indication of seed metering shaft movement.

SUMMARY OF INVENTION

The present invention is directed to a new and improved indicator system for indicating rotation of a seed metering shaft used with a grain drill. Specifically, the present invention incorporates a cylinder mounted to the seed metering shaft with its longitudinal axis offset but parallel to the axis of the shaft. The cylinder is mounted to rotate with the shaft. An indicator arm is hingedly mounted to the frame of the grain drill with one end positioned to ride on the outer surface of the cylinder and the other end free to move in correspondence with movement of the first end. With this invention, the indicator arm moves continually with movement of the seed metering shaft and thus provides a continuous indication of rotation of the seed metering shaft.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF PREFERRED EMBODIMENTS

Figure 1:
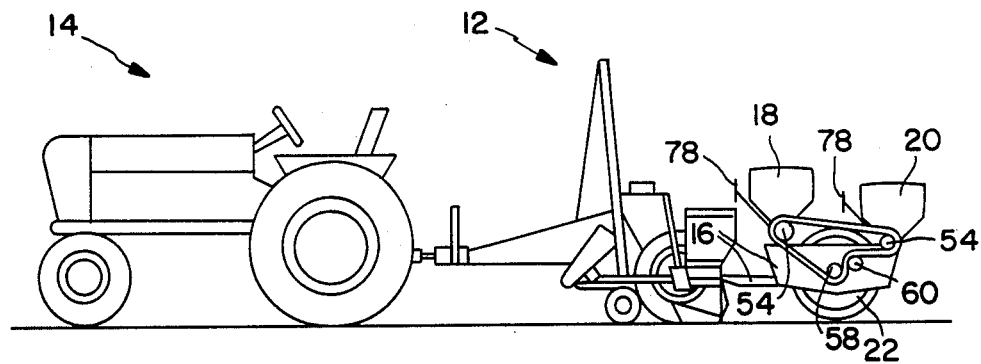
FIG. 1 is a perspective view of a grain drill with the indicator according to the present invention installed.
Figure 3:
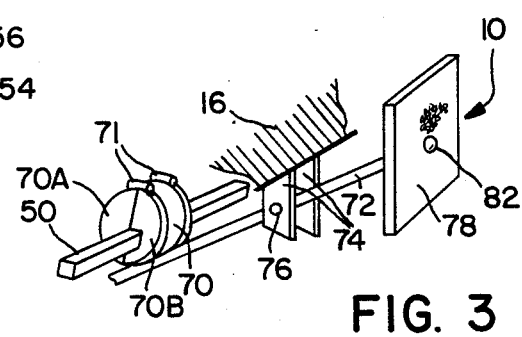
FIG. 3 is a perspective view of the indicator according to the present invention.
Figure 4:
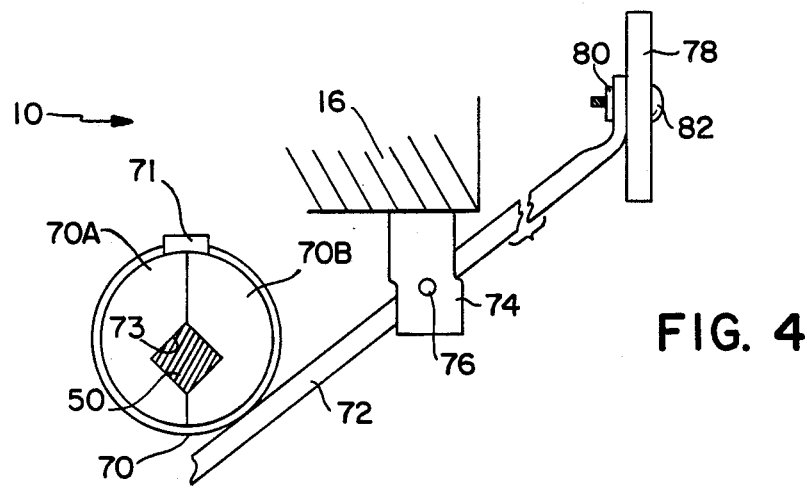
FIG. 4 is a side view of the indicator shown in FIG. 3.

An indicator 10 according to the present invention is shown in FIGS. 3 and 4. The rotation indicator 10 is installed on a grain drill 12 conventionally pulled by a tractor 14 as shown in FIG. 1. Grain drill 12 has a frame 16 which holds various components associated with the grain drill including grain hopper 18, fertilizer hopper 20 and ground wheel 22.

Figure 2:
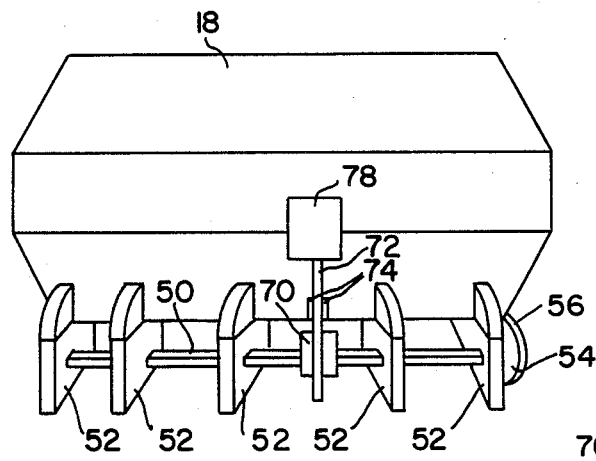
FIG. 2 is a perspective view of a portion of the front of a grain drill with the indicator shown in FIG. 1 installed.

The seed drill 12 includes a seed metering shaft 50 conventionally having a square cross-sectional shape to meter seeds dropped into furrows created by the seed drill. Seed metering shaft 50 is supported by bearings (not shown) and extends through seed dispersing tubes 52 connected to grain hoppers 18 as shown in FIG. 2. A sprocket 54 is secured at one end of the shaft 50. A chain 56 is trained around sprocket 54, over idler sprocket 60, and around drive sprocket 58. Drive sprocket 58 is mechanically connected to ground wheel 22. As ground wheel 22 rotates, this turns drive sprocket 58, rotating metering shaft sprockets 54, which in turn rotates seed metering shaft 50.

In accordance with the present invention, a cylinder 70, which has a longitudinal axis, is mounted on the seed metering shaft 50 with the longitudinal axis of the cylinder 70 offset from, but parallel to, the axis of rotation of the seed metering shaft 50 as shown in FIGS. 3 and 4. Cylinder 70 is formed in two parts, 70a and 70b, to enable the cylinder 70 to be positioned in surrounding relation to seed metering shaft 50 as shown in FIG. 4. The cylinder 70 has an interior bore 73 sized and shaped to frictionally fit over square shaft 50. The two portions, 70a and 70b, of cylinder 70 are held tightly to seed metering shaft 50 by clamps 71.

An indicator arm 72 includes a hole (not shown) formed therein transverse to the longitudinal axis of arm 72. This hole is sized to rotatably receive pin 76. The pin 76 is supported by a pair of support members 74 mounted to the grain drill frame 16 as shown in FIG. 3. Thus, this indicator arm 72 is hingedly connected to grain drill frame 16. Indicator arm 72 is positioned to have a first end abutting the outside, longitudinal surface of cylinder 70, as shown in FIGS. 3 and 4, which surface acts as a camming surface for arm 72. A second end of arm 72, is free to move and moves in a manner corresponding to the motion of the first end of arm 72. In a preferred embodiment, a reflector 78 is attached to the second end of arm 72 with bolt 82 and nut 80 to provide a visual indication of movement of arm 72.

In operation, the first end of arm 72, abutting the outside surface of cylinder 70, rides on this surface as shaft 50 rotates. The cylinder 70 is mounted with its longitudinal axis offset to the axis of seed metering shaft 50 as shown in FIG. 4. Thus, the arm 72 moves up and down as seed metering shaft 50 rotates. The movement of arm 72 is continuous as the shaft 50 rotates and thus provides an immediate and continuous indication that the seed metering shaft is functioning properly.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A seed metering shaft rotation indicator for use with a grain drill wherein the grain drill has a frame, multiple seed hoppers, and a rotatable seed metering shaft having an axis of rotation and extending through and between adjacent seed hoppers, the rotation indicator comprising:
   a cylinder, having a longitudinal center line, the cylinder being frictionally mounted eccentrically on the seed metering shaft to rotate with the seed metering shaft, the longitudinal center line of the cylinder being positioned to be offset from, and parallel to, the axis of rotation of the seed metering shaft;
   an indicator arm, having a first and second end, the arm being hingedly mounted to the grain drill frame about an axis parallel to the axis of rotation of the seed metering shaft, with said first end positioned to abut and ride on the outside, longitudinal surface of the cylinder and the second end free to move in correspondence with movement of the first end;
   a display means, mounted to the second end of the indicator arm, for providing a visual indication of arm movement;
   whereby movement of the arm corresponds to movement of the seed metering shaft which movement is continuously indicated by the display means.

2. A rotation indicator according to claim 1 wherein the display means has a reflective surface.

3. A rotation indicator according to claim 2 wherein the cylinder is formed in two parts to enable the cylinder to be positioned on the seed metering shaft and further including a clamp to hold the two parts of the cylinder on the seed metering shaft.

* * * * *